United States Patent [19]

Sakaguchi et al.

[11] Patent Number: 5,450,260
[45] Date of Patent: * Sep. 12, 1995

[54] SPACE SAVING SUPPORT MECHANISM FOR AN ECCENTRIC DRIVE PIN IN A ROTATING DISK STORAGE APPARATUS

[75] Inventors: Takahiro Sakaguchi, Kodaira; Hiroshi Sugahara, Tokyo, both of Japan

[73] Assignee: TEAC Corporation, Tokyo, Japan

[*] Notice: The portion of the term of this patent subsequent to Nov. 23, 2010 has been disclaimed.

[21] Appl. No.: 6,095

[22] Filed: Jan. 15, 1993

[30] Foreign Application Priority Data

Jan. 17, 1992 [JP] Japan .......................... 4-005413 U

[51] Int. Cl.⁶ .................... G11B 19/20; G11B 17/028
[52] U.S. Cl. ............................. 360/99.08; 360/99.12; 360/99.04; 360/99.05; 369/270
[58] Field of Search ............... 360/99.08, 99.12, 99.04, 360/99.05; 369/270, 271, 282

[56] References Cited

U.S. PATENT DOCUMENTS

| | | | |
|---|---|---|---|
| 4,445,155 | 4/1984 | Takahashi et al. | 360/99.04 |
| 4,649,444 | 3/1987 | Ichihara | 360/99.05 |
| 4,758,915 | 7/1988 | Sakaguchi | 360/99.04 |
| 4,855,850 | 8/1989 | Nagaoka et al. | 360/99.05 |
| 4,903,155 | 2/1990 | Maekawa | 360/99.05 |
| 5,103,358 | 4/1992 | Munekata | 360/99.08 |
| 5,126,900 | 6/1992 | Munekata | 360/99.05 |
| 5,264,978 | 11/1993 | Sakaguchi | 360/99.08 |

FOREIGN PATENT DOCUMENTS

| | | | |
|---|---|---|---|
| 59-87677 | 5/1984 | Japan | 369/270 |
| 60-95757 | 5/1985 | Japan | 369/270 |
| 60-136944 | 7/1985 | Japan | 360/99.08 |
| 63-271751 | 11/1988 | Japan | 369/270 |
| 63-271752 | 11/1988 | Japan | 369/270 |
| 03-25749 | 2/1991 | Japan | 369/270 |
| 04-178959 | 6/1992 | Japan | 369/258 |

*Primary Examiner*—Robert S. Tupper
*Assistant Examiner*—Craig A. Renner
*Attorney, Agent, or Firm*—Woodcock Washburn Kurtz Mackiewicz & Norris

[57] ABSTRACT

A disk drive with a turntable for supporting a flexible magnetic disk thereon has a spindle extending centrally through the turntable for engaging a first opening formed centrally in a sheet metal hub of the disk, and a drive pin arranged eccentrically of the turntable for driving the disk by engaging a second opening formed eccentrically in the disk hub. The drive pin support is made of a sheet metal support of resilient material and has an arcuate shape which is mounted flat to an underside of the turntable for deflection in a plan normal to that of the turntable. In view of the reduction of the space required for the deflection of the drive pin support and the total thickness or height of the disk drive, the drive pin is erected on an offset head portion of the support. The offset head portion together with the drive pin there-on is received in a clearance opening in the turntable so that a less space is required for the deflection of the drive pin support between the turntable and an underlying part such as a stator of a disk drive motor than that in the prior art.

5 Claims, 6 Drawing Sheets

SPACE SAVING SUPPORT MECHANISM FOR AN ECCENTRIC DRIVE PIN IN A ROTATING DISK STORAGE APPARATUS

BACKGROUND OF THE INVENTION

This invention relates generally to an apparatus for writing and/or reading information on disklike record media such as flexible magnetic disks, and more specifically to such an apparatus of the kind having a drive pin resiliently supported in an eccentric position on a turntable. The drive pin is engageable in an eccentric opening in the record medium for imparting the rotation of the turntable thereto. Still more specifically, the invention deals with an improved support mechanism for the drive pin of such a rotating disk data storage apparatus.

A flexible magnetic disk having an eccentric slot to be engaged by a drive pin is disclosed in U.S. Pat. No. 4,758,915 to Sakaguchi. This known magnetic disk has a diameter of three and a half inches and is rotatably housed in a generally flat, boxlike envelope of relatively rigid plastic material to make up a disk cassette. The magnetic disk has a rigid hub of magnetic material attached centrally thereto. The hub has a central opening of square shape and an eccentric opening of rectangular shape.

When a disk cassette is positioned in a disk drive, the magnetic disk has its central hub placed on a turntable which has a much smaller diameter than that of the disk. The turntable has a permanent magnet mounted thereon for attracting the disk hub. A spindle is disposed centrally on the turntable and engages in a central opening in the disk hub for centering the disk on the turntable. A drive pin is disposed eccentrically on the turntable for engaging the eccentric opening or slot in the disk hub and imparting the rotation of the turntable to the magnetic disk.

The drive pin must be resiliently supported on the turntable for both radial displacement parallel to the turntable and a displacement along an axis of the spindle. The radial and inward displacement of the drive pin is necessary for holding the disk in a proper position with respect to the turntable as the drive pin imparts the rotation of the turntable to the disk. The drive pin displacement parallel to the spindle axis is necessary to cause the drive pin to spring into the driving engagement position in the eccentric slot in the disk hub after the turntable starts rotation in sliding contact.

Conventionally, for resiliently supporting the drive pin, a planar spring was employed as disclosed in Sakaguchi U.S. Pat. No. 4,758,915, supra. A planar drive pin support spring is disposed parallel to the turntable and permits an easy displacement of the drive pin substantially parallel to the spindle axis. For a radial and inward displacement of the drive pin over the turntable, the planar drive pin support spring undergoes a torsional displacement which causes the drive pin to slant in the required direction.

This prior art device proved unsatisfactory as a current trend for disk drives is the reduction in their thickness or height. That is, the dimension in the axial direction of the spindle is reduced. This trend inherently demands the reduction of the space required for the deflection of the drive pin support spring along a substantially parallel axis of the spindle.

The space for deflection of the drive pin support spring needs to be smaller when the electric motor for driving the turntable is of the known rotor-outside-stator configuration. This type of motor has a rotor of annular shape coaxially secured to the periphery of the turntable for joint rotation therewith, and stator windings formed on a printed circuit board underlying the turntable. The space between the drive pin support spring and the stator windings is so small that the spring upon deflection easily hit the stator windings to cause damages.

SUMMARY OF THE INVENTION

The present invention seeks, in rotating disk data storage apparatus of the type defined, to reduce to a minimum the space required by a support mechanism for the drive pin to be engaged in an eccentric opening in the disk hub.

Stated in brief, the invention concerns an apparatus for data transfer with a rotating data storage disk, including a turntable for supporting the data storage disk on a first side thereof, a spindle extending centrally through the turntable for engaging in a first opening defined centrally in the data storage disk, and a drive pin disposed eccentrically with respect to the turntable and extending through a clearance opening in the turntable for engaging a second opening defined eccentrically in the data storage disk.

More specifically, the invention resides in a drive pin support mechanism comprising a drive pin support of resilient sheet metal for supporting the drive pin the drive pin support being cantilevered to place the drive pin support against a second side of the turntable for deflection in a plane perpendicular to a principal plane of the turntable in order to permit the drive pin to travel in a direction substantially normal to the principal plane of the turntable for driving engagement in the second opening in the disk. The drive pin support has an offset head portion on which the drive pin is mounted and which is normally received in the clearance opening in the turntable.

Since the drive pin is offset as above from the result of the planar drive pin support and normally received in the clearance opening in the turntable, a less space is required for the deflection of the drive pin support between the turntable and an underlying part such as the stator of a disk drive motor than the prior art. The prior art discloses that the drive pin is coplanar with the rest of the drive pin support. Conversely, if the space between the turntable and the underlying part is to be left the same as heretofore, a problem of the drive pin support hitting the underlying part on deflection is avoided.

The above and other features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
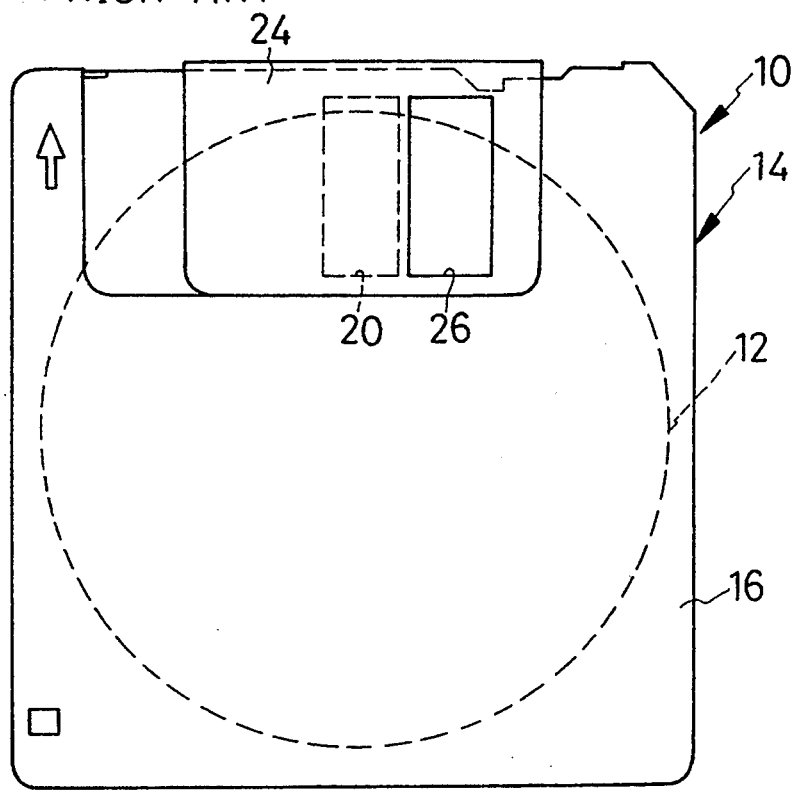
FIG. 1 is a top plan view of the conventional flexible magnetic disk cassette for use with the apparatus constructed in accordance with the present invention.
Figure 2:
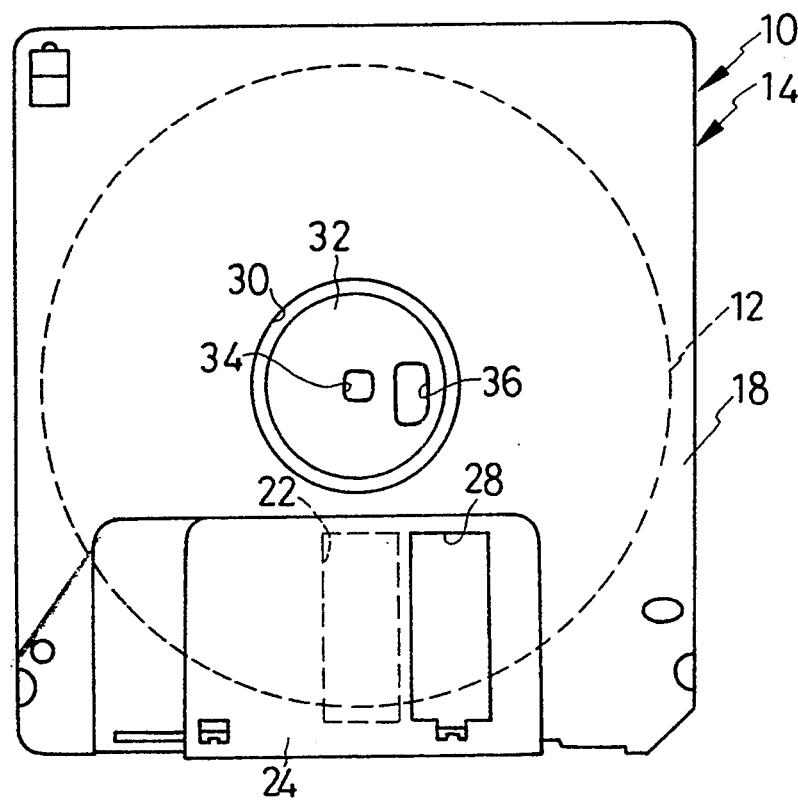
FIG. 2 is a bottom plan view of the magnetic disk cassette of FIG. 1.

A conventional three and a half inch flexible magnetic disk cassette for the practice of this invention will first be briefly described so as to better clarify the features and advantages of the invention. Generally, in FIGS. 1 and 2, the disk cassette 10 has a flexible magnetic disk 12 rotatably housed in a protective envelope 14 of rigid plastic material. The envelope 14 is of square, rather flat boxlike shape, having a front or top side 16 as shown in FIG. 1 and a rear or bottom side 18 as shown in FIG. 2.

Formed in both top 16 and bottom 18 sides of the envelope 14 and in the vicinity of one edge thereof, are apertures 20 and 22 which are in register with each other. The apertures 20 and 22 expose radial portions of the opposite sides of the magnetic disk 12 for data transfer via a pair of data transducers or read/write heads of the associated disk drive.

Normally, the apertures 20 and 22 are both closed by a sliding shutter 24 in the form of a rectangular piece of sheet metal bent into the shape of a letter U and mounted astride one edge of the envelope 14. The shutter 24 has itself two apertures 26 and 28 which are out of register with the envelope apertures 20 and 22 when the shutter is in the illustrated right hand position of FIGS. 1 and 2 under the bias of a spring (not shown).

When the disk cassette 10 is loaded in the associated disk drive, the shutter 24 will be forced leftwardly of the envelope 14 against the force of the unshown spring. When the shutter apertures 26 and 28 will come into register with the envelope apertures 20 and 22, the radial portions of the opposite sides of the magnetic disk 12 is exposed for data transfer via the data transducers of the disk drive.

The disk cassette 10 is to be placed upon the turntable of the disk drive with the top side 16 of its envelope 14 oriented upwardly. Therefore, as shown in FIG. 2, the bottom side 18 of the envelope 14 with a circular opening 30 formed centrally therein engages the turntable. Exposed through the opening 30 is a hub 32 in the form of a disk of magnetic sheet metal attached centrally to the magnetic disk 12. The hub 32 has defined therein a central opening 34 of a square shape and an eccentric opening 36 of a rectangular shape.

Figure 3:
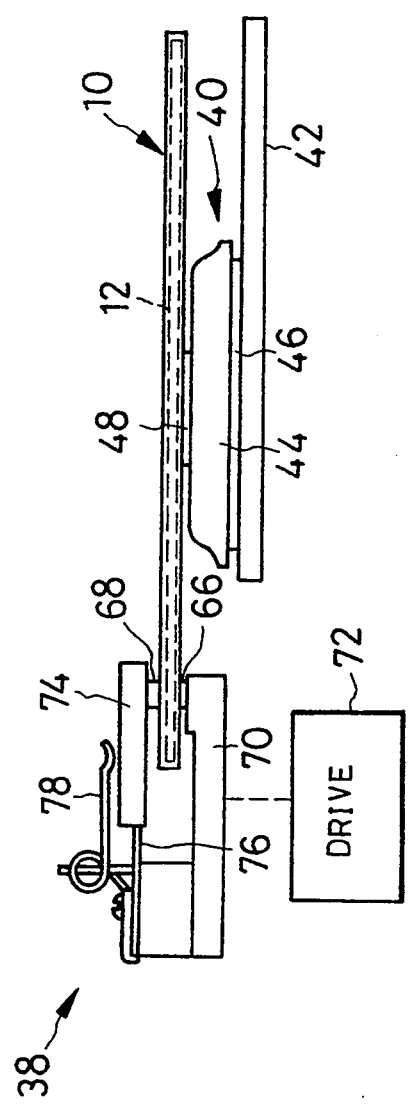
FIG. 3 is a side elevation view of the disk drive for use with the disk cassette of FIGS. 1 and 2, the disk drive incorporating the improved drive pin support mechanism in accordance with the invention.
Figure 4:
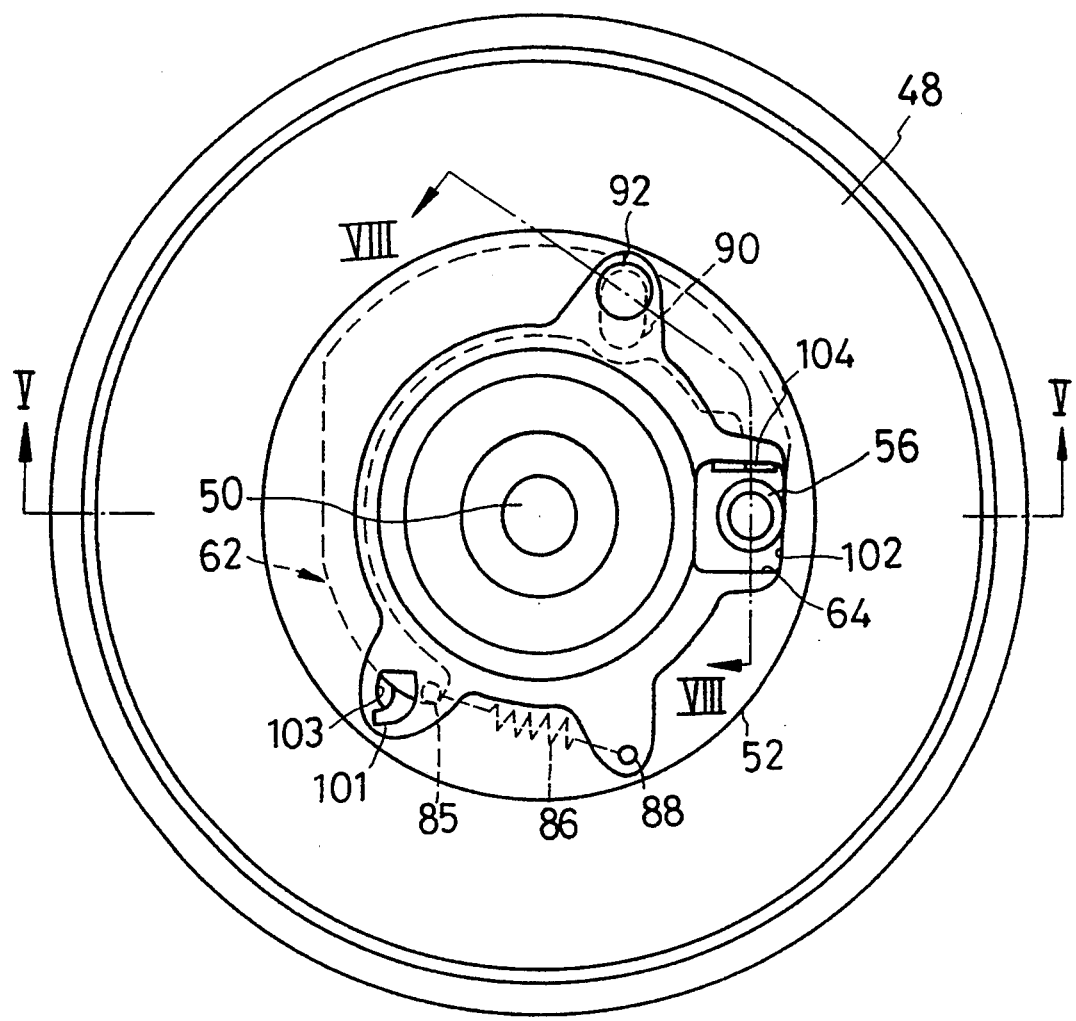
FIG. 4 is an enlarged top plan view of the turntable, together with the drive pin, drive pin support, and other means mounted thereto, in the disk drive of FIG. 3.
Figure 5:
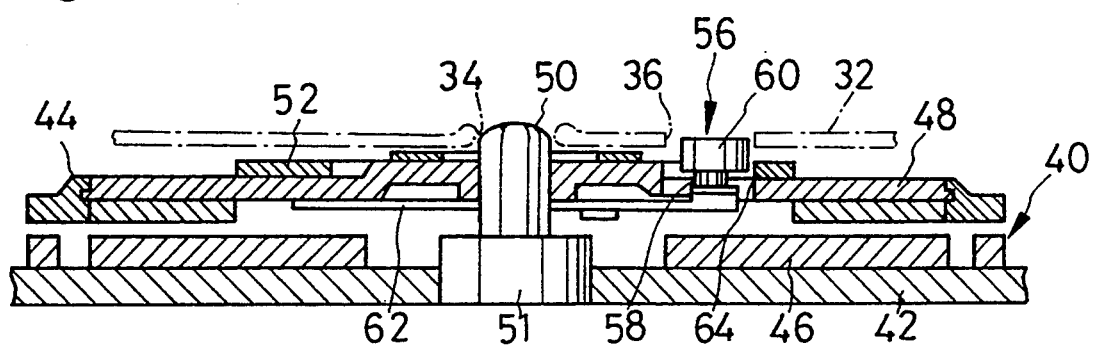
FIG. 5 is a section taken along the line V—V in FIG. 4.

Reference is now directed to FIGS. 3-5 for a study of a disk drive 38 for data transfer to and from the flexible magnetic disk cassette 10 as shown in FIGS. 1 and 2. The disk drive 38 has an electric disk drive motor 40 as shown in, FIG. 3, which is mounted on a printed circuit board 42. The disk drive motor 40 is of the conventional rotor-outside-stator configuration having a rotor 44 disposed outside a stator 46 which is formed on the printed circuit board 42. The rotor 44 is annular in shape and has its inside edge secured to the periphery of a turntable 48 for joint rotation therewith. The turntable 48 is mounted fast to a spindle 50, as shown in FIGS. 4 and 5, which is rotatably mounted to the printed circuit board 42 via bearings in a member 51 in FIG. 6.

The disk cassette 10 is to be loaded in the disk drive 38 with the hub 32 as shown in FIG. 2 of the flexible magnetic disk 12 placed concentrically upon the turntable 48. The spindle 50 projects upwardly from the turntable 48 for engaging in the central opening 34 in the disk hub 32.

As shown also in FIGS. 4 and 5, the turntable 48 has a permanent magnet 52 mounted thereto for attracting the disk hub 32. Preferably, the permanent magnet 52 may be fabricated from magnetic plastic material into an annular shape and is mounted concentrically on the turntable 48. This turntable itself may be made from magnetic material to form a closed magnetic circuit with the disk hub 32.

FIGS. 4 and 5 also disclose a drive pin 56 arranged eccentrically with respect to the turntable 48 for driving engagement in the eccentric slot 36 in the disk hub 32. Despite its name, however, the drive pin 56 may in practice be comprised of an upstanding shaft 58 and a roll 60 rotatably mounted thereon. The drive pin is placed on a support 62, which is placed under the turntable 48 for joint rotation. The drive pin 56 extends through an opening 64 in the turntable with clearance. The drive pin support 62 is fabricated from resilient material such as stainless steel in a sheet form. This drive pin support forms a principal part of the drive pin support mechanism according to the present invention.

When the disk cassette 10 is placed on the turntable 48 as shown in FIGS. 3 and 5, the spindle 50 will immediately enter the central opening 34 in the disk hub 32. In all likelihood, however, the drive pin 56 will initially be out of register with the eccentric slot 36 in the disk hub 32. Thus the roll 60 is depressed into the turntable 48 against the force of the resilient support 62. The drive pin 56 will come into register with the eccentric slot 36 as the turntable 48 is subsequently set into rotation. Thereupon the drive pin 56 will enter into the eccentric slot 36 by virtue of the energy that has been stored in the support 62. Then, the drive pin 56 is displaced radially and inwardly over the turntable by the disk hub 32 so as to, make driving engagement with the disk hub. The drive pin positively imparts the rotation of the turntable 48 to the magnetic disk 12 within the cassette envelope 14.

The drive pin support 62 permits displacement of the drive pin 56 in two directions, one parallel to the axis of the spindle 50 and the other normal thereto according to a preferred embodiment. With reference back to FIG. 3, the disk drive 38 is conventionally equipped with a pair of data transducers 66 and 68 for data transfer to and from both sides of the magnetic disk 12. The transducers 66 and 68 are both mounted to a carriage 70 for traveling across the annular concentric tracks on the magnetic disk 12. A carriage drive mechanism 72 for linearly moving the carriage 70 back and forth is shown as a block because of its conventional nature. An example of carriage drive mechanism comprises a bidirectional motor of the electric stepping type and a motion translating mechanism such as a lead screw for converting the bidirectional, incremental rotation of the stepping motor into the linear, stepwise, reciprocating motion of the carriage 70.

Although the bottom transducer 66 is mounted directly on the carriage 70, the top transducer 68 is mounted to a load arm 74 which in turn is pivotally mounted on the carriage via a cantilever spring 76. Also mounted to the carriage 70 is a torsional load spring 78 which acts on the load arm 74 for urging the top transducer 68 towards the bottom transducer 66. The load arm 74 with the top transducer 68 thereon is pivoted away from the bottom transducer 66 against the forces of the cantilever spring 76 and load spring 78 while the disk cassette 10 is being loaded in, or unloaded from the disk drive 38.

Figure 6:
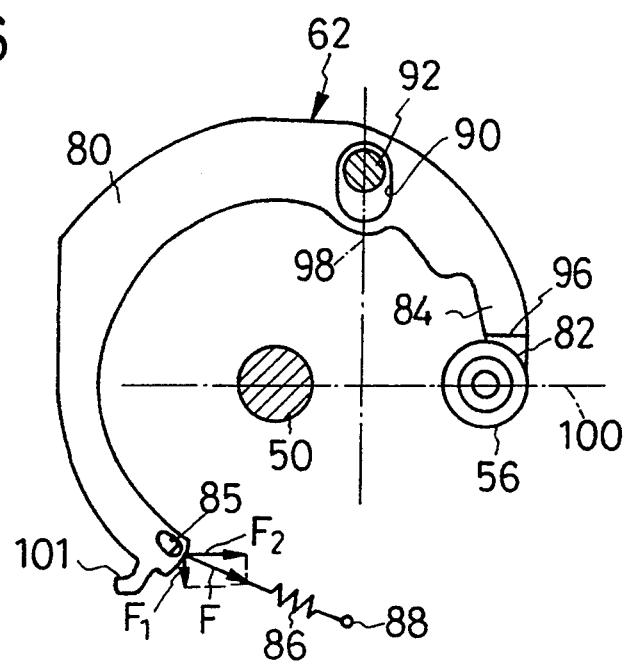
FIG. 6 is a top plan view of the drive pin support mechanism seen in FIG. 4, the drive pin support mechanism being shown in its normal state.
Figure 7:
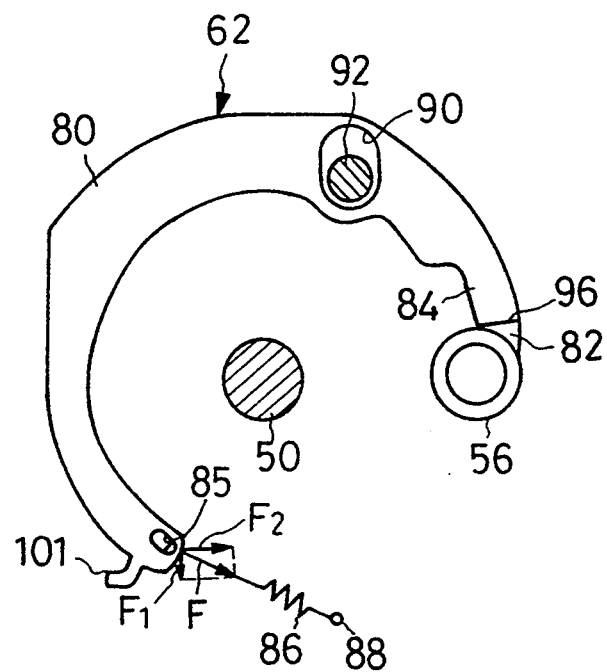
FIG. 7 is a view similar to FIG. 6 but showing the drive pin support mechanism in a state upon establishment of the driving engagement of the drive pin in the eccentric slot in the disk.

The reader's attention is now focused on FIGS. 6-9 for a detailed discussion of the drive pin support mechanism. FIG. 4 also shows the drive pin support 62 in a phantom outline to indicate the positions of its various parts in relation to the spindle 50, turntable 48 and drive pin 56. With particular reference to FIGS. 6 and 7, the drive pin support 62 has a substantially arcuate body portion 80 joined at one end to an offset head portion 82 via a constricted neck portion 84. The other end of the body portion 80 has a bore 85 for engagement with one end of a helical tension spring 86. The helical tension spring 86 has the other end for engaging a bore 88 of the turntable 48. The body portion 80 has a slot 90 in which a head pivot pin 92 depending from the turntable 48 is slidably received. Thus, the drive pin support 62 is mounted on the underside of the turntable 48 for both pivotal and linear movements. When the turn table is not rotating, the drive pin support 62 is mostly held flatwise against the turntable, with the body portion 80 extending over the circumference of the turntable.

Figure 8:
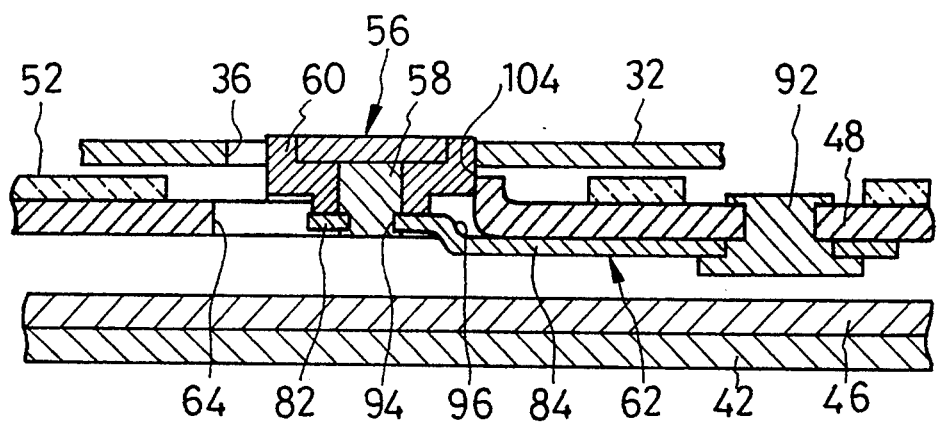
FIG. 8 is a fragmentary section taken along the line VIII—VIII in FIG. 4 and showing the drive pin support mechanism with the drive pin in driving engagement in the eccentric slot in the disk.
Figure 9:
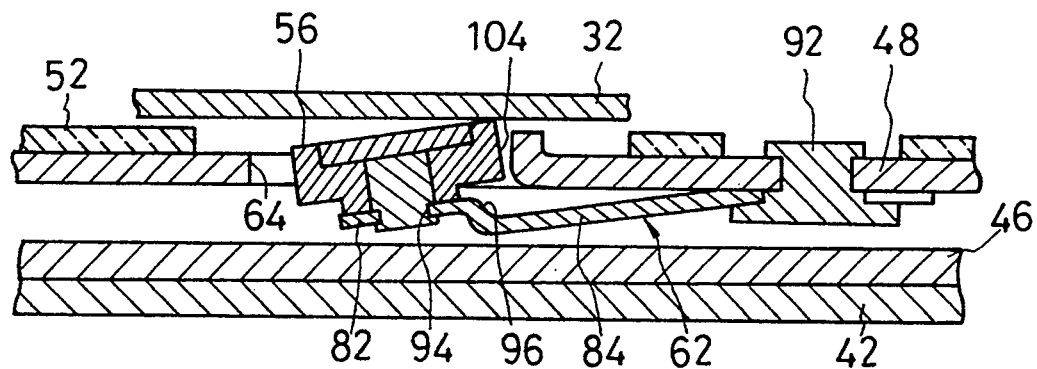
FIG. 9 is a view similar to FIG. 8 except that the drive pin is shown depressed into the clearance opening in the turntable by the hub of the disk.

As indicated in FIGS. 8 and 9, the shaft 58 of the drive pin 56 is closely inserted in a hole 94 in the head portion 82 of the drive pin support 62 and prevented from detachment therefrom by clinching its end. Thus, supported by the support 62, the drive pin 56 extends upwardly therefrom through the clearance opening 64 in the turntable 48 for driving engagement in the eccentric slot 36 in the disk hub 32.

According to a feature of this invention, an offset 96 is provided between the head portion 82 and the neck portion 84 of the drive pin support 62 whereby, as will be noted from FIGS. 8 and 9, the head portion 82 is set aside from the rest of the support and laid parallel thereto. It will also be observed in FIG. 8 that the offset head portion 82 is received in the clearance opening 64 in the turntable 48. The rest of the drive pin support 62 is slidably held against the underside of the turntable 48.

As seen in a plan view as in FIG. 6, the slot 90 in the body portion 80 of the drive pin support 62 extends in the direction of a first notional line 98 orthogonally intersecting a second notional line 100 connecting the axes of the spindle 50 and the drive pin 56. Accordingly, the drive pin support 62 is not only pivotable about the pivot pin 92 but also movable linearly in the direction of the first notional line 98 relative to the turntable 48. The tension spring 86 functions to bias the drive pin support 62 in a counterclockwise direction about the pivot pine 92 as viewed in FIGS. 4, 6 and 7.

FIGS. 6 and 7 indicate that the biasing spring 86 extends at an acute angle to the second notional line 100 so that the pulling force F exerted by this spring on the drive pin support 62 resolves itself into two vectors designated $F_1$ and $F_2$. The first vector $F_1$ which extends parallel to the first notional line 98, urges the drive pin support 62 to move in the direction of the slot 90 in its body portion 80 or substantially in a predetermined direction of clockwise rotation of the turntable 48, as viewed in FIG. 4. Normally, therefore, the drive pin support 62 is in the FIG. 6 position with respect to the headed pivot pin 92. Extending parallel to the second notional line 100, the second vector $F_2$ urges the drive pin support 62 to turn counterclockwise about the pivot pin 92 and so biases the drive pin 56 substantially radially outwardly of the turntable 48.

As shown also in FIGS. 6 and 7, the drive pin support 62 includes an offset lug or projection 101 which is located adjacent to its end and engages the tension spring 86. The lug 101 is slidably engaged in a guide opening 103 in the turntable 48 as shown in FIG. 4 so that the drive pin support 62 is more stably held against the underside of the turntable in the face of its angular and linear movements set forth above.

With reference to FIG. 4, the clearance opening 64 in the turntable 48, through which the drive pin 56 extends, is substantially square and has a first edge 102 extending parallel to the first notional line 98 and a second edge 104 extending parallel to the second notional line 100. The first edge 102 of the clearance opening 64, or of the edge of the magnet 52 laid flush therewith, serves to limit the travel of the drive pin 56 in a radially outward direction on the turntable 48 under the force vector $F_2$ of the biasing spring 86. The second edge 104 serves to limit the travel of the drive pin 56 in a direction opposite to the rotational direction of the turntable 48 when the drive pin is pushed against the force vector $F_1$ of the biasing spring 86 by the hub 32 of the magnetic disk 12, as will be detailed in the course of the subsequent description of operation.

Operation

When the turntable 48 is not rotating without a loaded disk cassette 10 the drive pin support 62 is held flatwise against the underside of the turntable 48. The drive pin 62 including the offset 96, the head portion 82, the upstanding shaft 58 and the roll 60 extend normal to the plane of the turntable 48 through the clearance opening 64 in the turntable. The offset head portion 82 of the drive pin support 62 will be received in the clearance opening 64 in the turntable 48.

When the disk cassette 10 is loaded in the disk drive 38, and the disk 12 is placed concentrically on the turntable 48, the spindle 50 enters into the central opening 34 in the disk hub 32. Being perhaps initially out of register with the eccentric slot 36 in the disk hub 32, the drive pin 56 is thereby urged against the turntable 48 causing the drive pin support 62 to deflect downwardly. Particularly the neck portion 84 is deflected, as shown in FIG. 9. It will be appreciated from this figure that, due to upward offsetting of the head portion 82 toward the clearance opening 64, the space between the turntable 48 and the stator 46 on the printed circuit board 42 is substantially reduced in comparison to that in the prior art. Further, the drive pin 56 also has a less axial dimension than heretofore.

Figure 10:
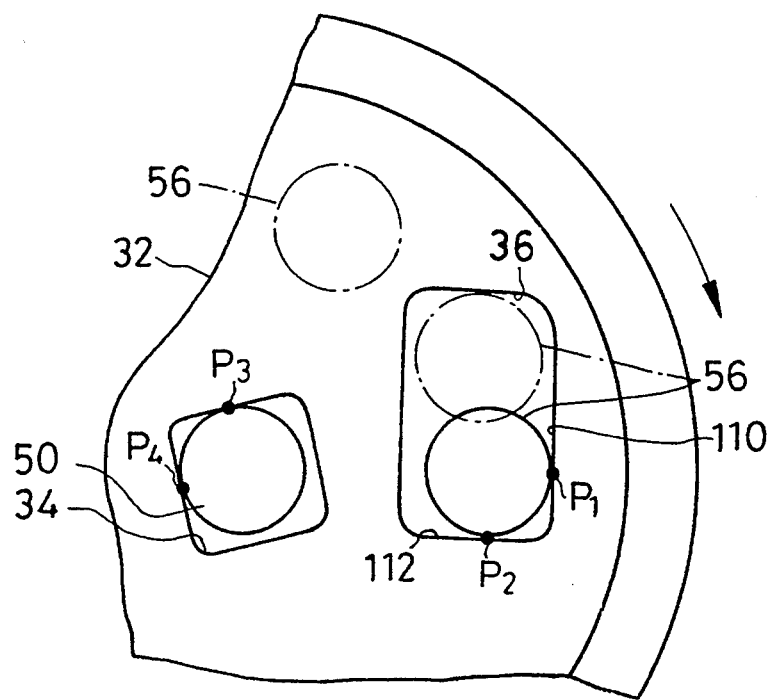
FIG. 10 is an enlarged, fragmentary top plan view of various positions of the drive pin with respect to the eccentric slot in the disk and the position of the spindle in the central opening in the disk during the rotation of the magnetic disk.

As the turntable 48 is subsequently set into rotation by the disk drive motor 40 in a clockwise direction as shown in FIG. 4, the drive pin 56 slides under the disk hub 32 and before one complete revolution of the turntable, comes into register with the eccentric slot 36 in the disk hub. Thereupon, the drive pin 56 engages the slot 36, as shown in FIG. 8, by virtue of the energy that has been stored in the drive pin support 62 upon deflection of its neck portion 84. Thus, when the drive pin enters into the eccentric slot 36, the drive pin 56 initially occupies the position indicated by the phantom outline as shown in FIG. 10. This position is at or adjacent the upstream end of the slot with respect to the rotational direction of the turntable.

A consideration of FIG. 10 reveals that the eccentric slot 36 extends at a non-right angle to a line connecting the axis of the disk hub 32 and the geometric center of the slot 36. That angle is such that the disk hub edge 110 limits the radial outer side of the slot 36 and draws nearer the center of the disk hub 32 as it extends in the direction of the marked arrow around the turntable. Consequently, the distance between the center of the disk hub 32 and the point of contact by the drive pin 56 on the edge 110 becomes minimum when the drive pin 56 reaches the solid line position of FIG. 10, contacting the radially outer edge 110 of the slot 36 at a point $P_1$ and the downstream edge 112 of the slot at a point $P_2$. The drive pin 56 is in a final drive position with respect to the disk hub 32 when the drive pine 56 is in the solid line position as shown in FIG. 10. The drive pin 56 in this final drive position properly engages the disk hub 32. The spindle 50, on the other hand, contacts at points $P_3$ and $P_4$ on two neighboring edges of a substantially square central opening 34 when the drive pin 56 is in the final drive position.

Before reaching the final drive position, the drive pin 56 comes into contact with the edge 110 of the slot 36 at a point somewhere upstream of the point $P_1$ as the drive pin revolves clockwise with respect to the turntable 48 after entering the slot in the phantom position of FIG. 10. The drive pin support 62 is in the position of FIG. 6 before the drive pin 56 comes into contact with the slot edge 110 because no force is being exerted by the disk hub 32 on the drive pin. After contacting the slot edge 110, the drive pin 56 slides over that edge during the continued rotation of the turntable 48 relative to the disk hub 32 and is thereby gradually forced toward the center of the disk hub. Radially inward travel of the drive pine 56 on the turntable 48 takes place as the drive pin support 62 pivots clockwise as shown in FIGS. 4, 6 and 7 against the force vector $F_2$ of the biasing spring 86. Thus, the drive pin 56 travels radially inward the turntable 48 with substantially no torsional deflection of the drive pin support 62 and also substantially no slanting of the drive pin.

After reaching the final drive position, the drive pin 56 starts driving the magnetic disk 12. Then, the disk 12 starts forcing the drive pin 56 in a direction opposite that of the rotation of the turntable 48 in opposition to the force vector $F_1$ of the biasing spring 86. Thereupon the drive pin support 62 with the drive pin 56 is linearly displaced along the first notional line 98 in a direction away from the second notional line 100 against the force vector $F_1$ of the biasing spring 86. This displacement is shown by a positional difference between FIG. 6 and FIG. 7. The drive pin 56 when in the position as shown in FIG. 7 butts against the second edge 104 of the clearance opening 64 in the turntable 48. The drive pin 56 travels with substantially no torsional deflection of the drive pin support 62 since the drive pin support 62 is movable linearly along the first line 98 relative to the pivot pin 92.

The drive pin 56 is now positioned for the proper driving engagement with the disk hub 32 and with the turntable 48. The drive pin firmly stays in this final drive position for positively imparting the rotation of the turntable 48 to the disk 12 as the force vector F of the biasing spring 66 urges the drive pin 56 against the radially outer edge 110 of the eccentric slot 36 in the disk hub 32.

As has been clearly set forth hereinbefore, the drive pin 56 travels in its own plane in both radial and circumferential directions relative to the turntable 48 with the displacement of the drive pin support 62. As the drive pin 56 maintains its upstanding upon establishment of driving engagement with the disk hub 32, substantially no positioning errors are to take place due to the slanting of the drive pin to varying degrees. Additionally, even if the magnetic disk 12 has a dimensional error in the distance between the central opening 34 and the eccentric slot 36, the drive pin 56 will nevertheless be properly positioned with respect to the central opening 34 because the final position of the drive pin 56 in the direction of the notional line 98 depends only upon the edge 104 of the clearance opening 64 in the turntable 48.

Second Embodiment

Figure 11:
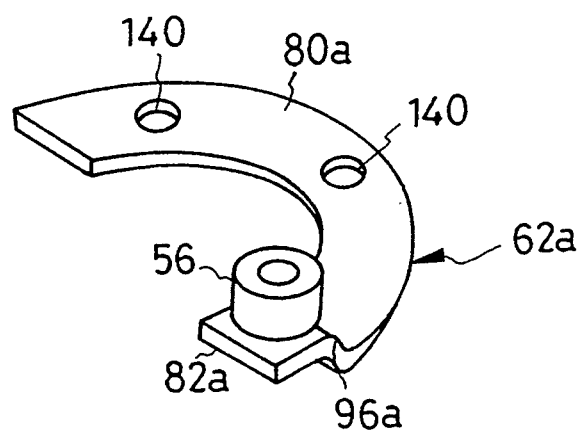
FIG. 11 is a perspective view of another preferred form of drive pin support mechanism in accordance with the current invention.

In FIG. 11, an alternate drive pin support 62a according to the invention is shown. The drive pin support 62a has a body portion 80a of arcuate shape which is cantilevered and fastened to the underside of the turntable 48 and through holes 140 in the body portion. The body portion 80a has its free end joined to a head portion 82a via an offset 96a whereby the head portion 82a is set aside from the body portion and laid parallel to the plane of the turntable. The offset head portion 82a is disposed in the clearance opening 64 in the turntable 48.

Thus, although neither is pivotable nor linearly displaceable in its own plane, the drive pin support 62a is deflectable to permit the drive pin 56 to move substantially parallel to the spindle axis and torsionally deformable for a radially inward movement over the turntable. It is therefore evident that this alternate drive pin support performs essentially the same functions as that of the first disclosed embodiment.

Although the drive pin support mechanism according to the present invention has been shown and described hereinbefore in some specific forms thereof and as adapted for the disk drive as shown in FIG. 3–5 for use with the magnetic disk cassette of the FIGS. 1–2, it is not desired that the invention be limited by the exact details of the illustrated drive pin support mechanisms, of the disk drive or of the disk cassette. For example, in the FIGS. 3–9, it is not an absolute requirement that the drive pin support 62 be linearly movable relative to the turntable so that this drive pin support could be mounted on the turntable for pivotal movement only by receiving the headed pivot pin 92 in a hole of circular shape formed in its body portion 80 in place of the slot 90. A variety of other modifications, alterations or adaptations of the illustrated embodiments may be resorted to without departure from the fair meaning or proper scope of the following claims.

What is claimed is:

1. A drive pin support for driving a data storage disk, which rotates on a first side of a turntable, a spindle extending centrally through the turntable for engaging a first opening defined centrally in the data storage disk, and a drive pin arranged eccentrically of the turntable extending through a clearance opening in the turntable for driving the data storage disk by engaging a second opening defined eccentrically in the data storage disk, the drive pin having an axis which is substantially parallel to an axis of the spindle, the drive pin support comprising:

(a) a drive pin support arm of resilient sheet metal for supporting the drive pin and for urging the drive pin support arm against a second side of the turntable so as to deflect on a plane perpendicular to a principal plane of the turntable in order to permit the drive pin to travel in a direction substantially normal to the principal plane of the turntable;

(b) mounting means for mounting the drive pin support arm to the second side of the turntable for joint rotation therewith, the mounting means permitting the drive pin support arm with the drive pin thereon to travel linearly relative to the turntable in a plane parallel to the principal plane of the turntable along a first notional line orthogonally intersecting a second notional line extending through the axes of the drive pin and the spindle; and (c) resilient means acting between the drive pin support arm and the turntable for urging the drive pin support arm at least toward the second notional line along the first notional line;

(d) an offset head portion on which the drive pin is mounted, the offset head portion being received in the clearance opening in the turntable, wherein less space is required for the deflection of the drive pin support arm between the turntable and a part disposed opposite the second side of the turntable.

2. An apparatus for data transfer with a rotating data storage disk including a turntable for supporting the data storage disk on a first side thereof, the turntable having a predetermined direction of rotation, a spindle extending centrally through the turntable for engaging a first opening defined centrally in the data storage disk, and a drive pin disposed eccentrically with respect to the turntable extending through a clearance opening in the turntable for engaging a second opening defined eccentrically in the data storage disk, the drive pin having an axis which is substantially parallel to an axis of the spindle, the apparatus comprising:

(a) a drive pin support of resilient sheet metal supporting the drive pin and held flatwise against a second side of the turntable for deflection in a plane perpendicular to a principal plane of the turntable in order to permit the drive pin to travel in a direction substantially normal to the principal plane of the turntable;

(b) mounting means for mounting the drive pin support to the second side of the turntable for joint rotation therewith and for pivotal motion relative to the turntable about an axis in an eccentric position on the turntable, the mounting means permitting the drive pin support with the drive pin thereon to travel linearly relative to the turntable in a plane parallel to the principal plane of the turntable along a first notional line orthogonally intersecting a second notional line extending through the axes of the drive pin and the spindle; and (c) resilient means acting between the drive pin support and the turntable for urging the drive pin both in the predetermined direction of rotation of the turntable and radially outwardly of the turntable;

(d) the drive pin support having an offset head portion on which the drive pin is mounted and which is received in the clearance opening in the turntable, wherein less space is required for the deflection of the drive pin support between the turntable and a part disposed opposite the second side of the turntable.

3. An apparatus for data transfer with a rotating data storage disk, including a turntable for supporting the data storage disk on a first side thereof, the turntable having a predetermined direction of rotation, a spindle extending centrally through the turntable for engaging a first opening defined centrally in the data storage disk, and a drive pin arranged eccentrically of the turntable and extending through a clearance opening in the turntable for driving the data storage disk by engaging a second opening defined eccentrically in the data storage disk, the drive pin having an axis parallel to an axis of the spindle, the apparatus comprising:

(a) a drive pin support of resilient sheet metal material and substantially arcuate shape supporting the drive pin and held flatwise against a second side of the turntable for deflection in a plane perpendicular to a principal plane of the turntable in order to permit the drive pin to travel in a direction substantially normal to the principal plane of the turntable, the drive pin support having defined intermediate opposite ends thereof a slot extending along a first notional line orthogonally intersecting a second notional line extending through the axes of the drive pin and the spindle;

(b) a pivot pin formed in an eccentric position on the turntable and slidably engaged in the slot in the drive pin support so that the drive pin support is both pivotable and movable linearly along the first notional line relative to the turntable; and (c) a biasing spring acting between the turntable and one end of the drive pin support for urging the drive pin both in the predetermined direction of rotation of the turntable and radially outwardly of the turntable;

(d) the drive pin support having an offset head portion at another end thereof on which the drive pin is mounted and which is received in the clearance opening in the turntable, wherein less space is required for the deflection of the drive pin support between the turntable and a part disposed opposite the second side of the turntable.

4. The apparatus of claim 3 wherein the drive pin support is a formed to include a constricted neck portion adjacent the offset head portion.

5. The apparatus of claim 3 wherein the drive pin support is formed to include a projection slidably engaged in a guide opening in the turntable.

* * * * *